US009397392B2

(12) United States Patent
van Oosterbosch et al.

(10) Patent No.: US 9,397,392 B2
(45) Date of Patent: Jul. 19, 2016

(54) GEODESIC RADOME

(75) Inventors: Eelco van Oosterbosch, Echt (NL); Reimo Nickel, Echt (NL); Chae Thompson, Stanley, NC (US); David Cunningham, Stanley, NC (US)

(73) Assignee: DSM IP ASSETS B.V., Heerlen (NL)

( * ) Notice: Subject to any disclaimer, the term of this patent is extended or adjusted under 35 U.S.C. 154(b) by 271 days.

(21) Appl. No.: 14/001,554

(22) PCT Filed: Mar. 5, 2012

(86) PCT No.: PCT/EP2012/053734
§ 371 (c)(1),
(2), (4) Date: Nov. 7, 2013

(87) PCT Pub. No.: WO2012/119981
PCT Pub. Date: Sep. 13, 2012

(65) Prior Publication Data
US 2014/0098001 A1 Apr. 10, 2014

(30) Foreign Application Priority Data

Mar. 4, 2011 (EP) ..................... 11156973

(51) Int. Cl.
*H01Q 1/42* (2006.01)
*B29C 70/04* (2006.01)
*B29C 70/34* (2006.01)

(52) U.S. Cl.
CPC *H01Q 1/42* (2013.01); *B29C 70/04* (2013.01); *B29C 70/34* (2013.01)

(58) Field of Classification Search
CPC ........... H01Q 1/42; B29C 70/04; B29C 70/34
See application file for complete search history.

(56) References Cited

U.S. PATENT DOCUMENTS

| | | | | |
|---|---|---|---|---|
| 3,386,872 A * | 6/1968 | Medney | ................ | B29C 53/56 156/173 |
| 3,427,628 A * | 2/1969 | Clunis | ................ | H04N 5/82 346/77 E |
| 4,398,451 A * | 8/1983 | Werthmann | .............. | B32B 5/06 442/35 |
| 4,413,110 A | 11/1983 | Kavesh | | |
| 4,901,483 A | 2/1990 | Huegy | | |
| 4,946,736 A * | 8/1990 | Sassa | ................ | H01Q 1/422 156/324 |
| 5,140,790 A | 8/1992 | Modglin et al. | | |
| 5,433,777 A * | 7/1995 | Sheppard | ................ | B01J 19/30 106/400 |
| 5,456,779 A * | 10/1995 | Sinha | ................ | H01Q 15/168 156/91 |
| 5,493,771 A * | 2/1996 | Sinha | ................ | H01Q 15/168 29/600 |
| 5,674,802 A * | 10/1997 | Sheppard | ................ | B01J 19/30 502/439 |
| 5,919,493 A * | 7/1999 | Sheppard | ................ | B01J 19/30 425/174.2 |
| 6,045,923 A * | 4/2000 | Kok | ................ | B32B 27/32 428/500 |
| 6,098,347 A | 8/2000 | Jaeger et al. | | |
| 6,173,547 B1 | 1/2001 | Lipson | | |
| 6,201,514 B1 * | 3/2001 | Iwasawa | ................ | H01Q 1/36 343/841 |
| 7,976,932 B1 * | 7/2011 | Lyons | ................ | B32B 5/12 139/383 R |
| 2002/0055316 A1 * | 5/2002 | Araida | ................ | B32B 5/26 442/382 |
| 2003/0082969 A1 * | 5/2003 | Arthurs | ................ | B32B 5/22 442/76 |
| 2004/0148887 A1 * | 8/2004 | Di Pede | ................ | B32B 3/30 52/408 |
| 2005/0066593 A1 * | 3/2005 | Haas | ................ | E04D 15/02 52/198 |
| 2006/0188726 A1 * | 8/2006 | Muenz | ................ | C08J 9/0061 428/413 |
| 2007/0039683 A1 * | 2/2007 | Morin | ................ | B32B 5/26 156/245 |
| 2007/0178784 A1 * | 8/2007 | Jones | ................ | B32B 27/12 442/41 |
| 2007/0264471 A1 * | 11/2007 | Kalwara | ............. | B29C 65/5057 428/141 |
| 2008/0309569 A1 * | 12/2008 | Berejik | ................ | H01Q 1/185 343/761 |
| 2010/0117914 A1 * | 5/2010 | Feller | ................ | H01Q 1/42 343/757 |
| 2010/0173110 A1 * | 7/2010 | Wiercinski | ................ | B32B 7/12 428/40.3 |
| 2011/0052852 A1 * | 3/2011 | Samanta | ................ | E04D 5/10 428/40.3 |
| 2015/0166743 A1 * | 6/2015 | Restuccia | ................ | C08J 5/10 428/327 |
| 2015/0260483 A1 * | 9/2015 | Wibby | ................ | F41H 5/0478 89/36.08 |

FOREIGN PATENT DOCUMENTS

| | | |
|---|---|---|
| EP | 0 200 547 | 11/1986 |
| EP | 0 205 960 | 12/1986 |
| EP | 0 213 208 | 3/1987 |
| EP | 0 472 114 | 2/1992 |
| EP | 1 350 868 | 10/2003 |
| EP | 1 699 954 | 9/2006 |
| GB | 2 042 414 | 9/1980 |
| GB | 2 051 667 | 1/1981 |
| WO | WO 01/73173 | 10/2001 |
| WO | WO 2010/122099 | 10/2010 |

OTHER PUBLICATIONS

International Search Report for PCT/EP2012/053734, mailed May 16, 2012.
Peijs, A A J M et al., "Hybrid composites based on polyethylene and carbon fibres Part 2 : influence of composition and adhesion level of polyethylene fibres on mechanical properties", Composites, vol. 21, No. 6, (Nov. 1, 1990), pp. 513-521.

(Continued)

*Primary Examiner* — Jeanette E Chapman
(74) *Attorney, Agent, or Firm* — Nixon & Vanderhye P.C.

(57) ABSTRACT

The invention relates to a geodesic radome comprising shaped panels containing a consolidated plurality of plies, the plies comprising polyolefin tapes, wherein the shaped panels have a compressive strength of between 10 MPa and 100 MPa, an interlaminar shear strength of between 3 MPa and 75 MPa and a thermal expansion of between 1e−6 1/K and 50e−6 1/K.

15 Claims, No Drawings

(56) References Cited

OTHER PUBLICATIONS

Sondhelm, W.S., "Technical fabric structures—1. Woven fabrics", Handbook of Technical Textiles, pp. 62-94, (printed on Aug. 23, 2013).

Anand, S.C., "Technical fabric structures—2. Knitted fabrics", Handbook of Technical Textiles, pp. 95-129, (printed on Aug. 23, 2013).

Smith, P.A., "Technical fabric structures—3. Nonwoven fabrics", Handbook of Technical Textiles, pp. 130-151, (printed on Aug. 23, 2013).

Ogin, Stephen L., "Textile-reinforced composite materials", Handbook of Technical Textiles, pp. 264-281, (printed on Aug. 23, 2013).

Nakajima, T., "Advanced fiber spinning technology", Woodhead Publishing Limited, Ref. Chapter 8—Gelspinning, pp. 172-186, (21 pages, printed on Aug. 23, 2013).

* cited by examiner

GEODESIC RADOME

This application is the U.S. national phase of International Application No. PCT/EP2012/053734, filed 5 Mar. 2012, which designated the U.S. and claims priority to EP Application No. 11156973.7, filed 4 Mar. 2011, the entire contents of each of which are hereby incorporated by reference.

The present invention relates to a geodesic radome comprising shaped panels containing a consolidated plurality of plies, the plies comprising polyolefin tapes.

Such a geodesic radome is known for example from WO 2010/122099, the radome disclosed therein comprising compressed sheets or panels having a unique bending modulus in at least two directions. Said compressed panels may also contain a consolidated plurality of layers or plies comprising polyolefin tapes. Although of high quality, it was observed that the geodesic radomes of WO 2010/122099 could still be improved.

A geodesic radome is a geodesic structure typically used for covering and protecting an antenna. Antennas and in particular large antennas such as radar installations, weather stations, wireless satcom/telecom infrastructure and radio telescopes often need a geodesic radome to protect them from weather, e.g. sunlight, wind, rain, snow, hail, sand, salt spray, insects, animals, UV damage, and wide temperature fluctuations. The presence of the geodesic radome is particularly needed for antennas placed in regions where high winds or storms often occur, in order to protect the antennas from winds, hale and impacts from projectiles such as debris carried by the wind.

It is known that geodesic radomes are subjected to a variety of loads mainly due to natural forces acting thereupon such as those mentioned hereinabove, e.g. winds, snow, rain and hale. These loads are of various natures, the most hazardous ones being compression loads and shear loads. Another important factor in case of a radome is its thermal stability as variations in the temperature of the environment in which the geodesic radome is placed may give rise to unwanted loads. In particular for large geodesic radomes, temperature variation induced loads may shorten the lifetime of the radome.

An aim of the present invention may therefore be to provide a geodesic radome having optimized mechanical characteristics. Another aim of the present invention may be to provide a geodesic radome constructed from shaped panels, said radome having a good response to loads acting thereupon, e.g. compressive loads and shear loads. Yet another aim of the present invention may be to provide a geodesic radome having optimal thermal properties.

The invention provides a geodesic radome comprising shaped panels containing a consolidated plurality of plies, the plies comprising polyolefin tapes, wherein the shaped panels have a compressive strength of between 10 MPa and 100 MPa, an interlaminar shear strength of between 3 MPa and 75 MPa and a thermal expansion of between $1e-6$ $1/K$ and $50e-6$ $1/K$.

After an extensive and prolonged study, the present inventors observed that by using shaped panels having mechanical characteristics within the above-mentioned ranges, an optimized geodesic radome may be obtained. In particular they observed that the geodesic radome of the invention has an optimal combination of mechanical characteristics, which in turn enables said radome to successfully withstand loads generated by e.g. wind, snow and/or ice acting thereon. They also observed that the geodesic radome of the invention has an optimum safety factor and that a catastrophic failure, e.g. a collapse, may be less prone to occur.

Without being bound to any explanation, the present inventors attributed these advantages to a synergy between the various mechanical characteristics mentioned hereinabove. For example, for a geodesic radome facing a wind or a stream of air, depending on the wind direction and the type of wind flow, i.e. the grade of wind turbulence, different pressure regions, e.g. positive and negative pressure regions, may appear on the surface of said radome. The different pressure regions generate a specific load amplitude and load distribution over the radome surface, which need to be optimally managed by the geodesic radome. Temperature variations may also appear over the surface of the geodesic radome as a cooling effect may occur at the locations where the winds meet said radome. The inventors observed that using for example shaped panels with a too low compressive strength, interlaminar strength and/or thermal expansion, may deleteriously influence the resistance and response of the geodesic radome to loading. On the other hand, using shaped panels with too high such properties may also deleteriously influence the efficiency with which a geodesic radome containing thereof manages the wind loading.

The geodesic radome of the invention comprises shaped panels. By a shaped panel is herein understood a panel having a shape suitable for utilization in the construction of a geodesic radome. Suitable shapes include triangles, rectangles, squares, hexagons, octagons and other multi-sided shapes having rectilinear or curved sides, e.g. orange peel-like shape. The geodesic radome of the invention may also contain a combination of shaped panels having the above mentioned shapes.

In one embodiment, the geodesic radome of the invention comprises triangular panels, preferably said radome being a structure that can be mapped entirely from said triangular panels. A geodesic radome mapped entirely from triangular panels and a method for producing thereof are known for example from U.S. Pat. No. 4,901,483 included herein by reference.

In another embodiment, the geodesic radome of the invention comprises gore-shaped panels such as the ones disclosed for example in U.S. Pat. No. 5,140,790 included herein by reference.

In yet another embodiment, the geodesic radome of the invention comprises five-sided panels and six-sided panels, wherein the five-sided panels are adjacent to and abutting the six-sided panels. Such a structure is disclosed for example in U.S. Pat. No. 5,873,206 included herein by reference.

It was observed that the larger the size of the geodesic radomes of the invention, the more optimized said radomes are. Typically a geodesic radome is used to cover or protect a ground surface and its shape is characterized by a set of geometrical characteristics including a height, a spherical diameter and a ground diameter. Preferably, the geodesic radome of the invention has a ground diameter of at least 3 m, more preferably of at least 5 m, most preferably of at least 8 m. Preferably, said diameter is at most 30 m, more preferably at most 25 m, most preferably at most 20 m. By ground diameter of the geodesic radome is herein understood the largest distance between two locations on the peripheral edge of the ground surface protected by said radome. Typically the ground surface protected by a geodesic radome has a circular shape, in this case by ground diameter being understood the diameter of said circular shape. Preferably, the geodesic radome of the invention has a height of at least 3 m, more preferably of at least 5 m, most preferably of at least 8 m. Preferably, said height is at most 15 m, more preferably at most 12.5 m, most preferably at most 10 m. By height of the geodesic radome is herein understood the largest distance between the ground surface and the surface of the geodesic radome. Preferably geodesic radome of the invention has a ground diameter/height ratio of between 0.1 and 100, more preferably of between 1 and 50, most preferably of between 2 and 10. In case of a geodesic radome having a shape in the form of a truncated sphere, the spherical diameter, i.e. the diameter of the sphere, of the geodesic radome is preferably at least 3 m, more preferably at least 5 m, most preferably at least 8 m.

The shaped panels used in accordance with the invention comprise a consolidated plurality of plies. By consolidated plurality of plies is herein understood a plurality of plies attached to each other, e.g. by the application of heat and pressure, to preferably form a monolithic structure.

According to the invention, the plies comprise polyolefin tapes. By tape is herein understood a body having a length dimension, a width dimension and a thickness dimension, wherein the length dimension of the tape is at least about the same as its width dimension but preferably greater than its width dimension, and wherein said length dimension is much greater than its thickness dimension. The tape also has a cross section having a periphery edge, said cross section being characterized by a width and a thickness. By width is herein understood the highest transverse dimension of the cross section and by thickness is herein understood the lowest transverse dimension of the cross section. The term tape also comprises the embodiments of a ribbon, a strip and a film.

Suitable tape widths are between 1 mm and 2000 mm, preferably between 15 mm and 1600 mm, more preferably between 30 mm and 1600 mm. Suitable tape thicknesses are between 5 µm and 5000 µm, preferably between 10 µm and 1000 µm, more preferably between 10 µm and 500 µm. The ratio between the width of the tape and the thickness of the tape is preferably at least 10:1, more preferably at least 25:1, most preferably at least 50:1. The tapes and in particular the UHMWPE tapes, preferably have an areal density of at least 20 g/m2, more preferably at least 30 g/m2, most preferably at least 40 g/m2. Said areal density is preferably at most 55 g/m2, more preferably at most 50 g/m2, most preferably at most 45 g/m2.

Good results may be obtained when the polyolefin tapes are polyethylene tapes. Preferred polyethylene tapes are high and ultrahigh molecular weight polyethylene ([U]HMWPE) tapes. Polyolefin tapes and in particular polyethylene tapes may be manufactured by any technique known in the art, e.g. a solid-state, melt spinning or a gel spinning process. If a melt spinning process is used, the polyolefin and in particular the polyethylene starting material used for manufacturing thereof preferably has a weight-average molecular weight between 20,000 g/mol and 600,000 g/mol, more preferably between 60,000 g/mol and 200,000 g/mol. An example of a melt spinning process is disclosed in EP 1,350,868 incorporated herein by reference. If the gel spinning process is used to manufacture said tapes, preferably an UHMWPE is used with an intrinsic viscosity (IV) of preferably at least 3 dl/g, more preferably at least 4 dl/g, most preferably at least 5 dl/g. Preferably the IV is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Preferably the UHMWPE tapes are manufactured according to a gel spinning process as described in numerous publications, including EP 0205960 A, EP 0213208 A1, U.S. Pat. No. 4,413,110, GB 2042414 A, GB-A-2051667, EP 0200547 B1, EP 0472114 B1, WO 01/73173 A1, EP 1,699,954 and in "*Advanced Fibre Spinning Technology*", Ed. T. Nakajima, Woodhead Publ. Ltd (1994), ISBN 185573 182 7. To obtain tapes, the above mentioned processes were using spinning dyes having spinning slits instead of spinning holes.

Preferably, the polyolefin and in particular the polyethylene tapes used in accordance to the invention, are made by a solid-state process, i.e. a process comprising step a) compression-moulding a polyolefin powder bed between pressuring means, e.g. a double-belt press, at a temperature below the melting point of the polyolefinic powder; step b) conveying the resultant compression-moulded powder between calendar rolls to form a tape; and step c) drawing the tape. Tapes made with the solid-state process are usually referred to as solid-state tapes. Preferably, the polyolefin powder is a UHMWPE powder. Preferably, the UHMWPE powder has an IV of preferably at least 3 dl/g, more preferably at least 4 dl/g, most preferably at least 5 dl/g. Preferably said IV is at most 40 dl/g, more preferably at most 25 dl/g, more preferably at most 15 dl/g. Using solid-state polyolefin solid-state tapes and in particular UHMWPE solid-state tapes, improved geodesic radomes may be obtained.

Drawing, preferably uniaxial drawing, of the produced solid-state tapes may be carried out by means known in the art. Such means comprise extrusion stretching and tensile stretching on suitable drawing units. To attain increased mechanical strength and stiffness, drawing may be carried out in multiple steps. In case of the preferred UHMWPE tapes, drawing is preferably carried out uniaxially in a number of drawing steps. The first drawing step may for instance comprise drawing to a stretch factor of 3. By multiple drawing at increasing temperatures, stretch factors of about 50 and more may be reached, whereby the process is run under such conditions, that no melting of the tape occurs e.g. a temperature below the melting temperature of the tape. This results in the high strength tapes, whereby at least for tapes of UHMWPE, strengths of 1.5 GPa and more may be obtained.

The tensile strength of the polyolefin tapes and more in particular of the polyethylene tapes used in accordance with the invention is preferably at least 0.5 GPa, more preferably at least 1 GPa, most preferably at least 1.5 GPa. The tensile modulus of said polyolefin tapes and more in particular of the polyethylene tapes is preferably at least 30 GPa, more preferably at least 50 GPa, most preferably at least 110 GPa. Good results may be obtained when the polyolefin tapes are UHMWPE tapes having a tensile strength of at least 1.3 GPa, more preferably at least 1.5 GPa and preferably a tensile modulus of at least 100 GPa, more preferably of at least 105 GPa, most preferably at least 110 GPa.

According to the invention, the geodesic radome comprises panels containing a consolidated plurality of plies. Preferably, the plies contain a fabric, e.g. a woven, knitted, plaited, braided or a non-woven fabric or combinations thereof, said fabric comprising the polyolefin tapes. Preferred fabrics are woven fabrics, suitable examples thereof including without limitation plain weave, rib, basket and matt weave and twill weave fabrics and the like. Knitted fabrics may be weft knitted, e.g. single- or double-jersey fabric or warp knitted. Examples of non-woven fabrics include a felt fabric and a unidirectional fabric, i.e. a fabric wherein a majority of polymeric fibers, e.g. at least 80 mass % of all fibers in the fabric, more preferably all fibers in the fabric, run in a substantially parallel fashion along a common direction. Further examples of woven, knitted or non-woven fabrics as well as the manufacturing methods thereof are described in "*Handbook of Technical Textiles*", ISBN 978-1-59124-651-0 at chapters 4, 5 and 6, the disclosure thereof being incorporated herein as reference. A description and examples of braided fabrics are described in the same Handbook at Chapter 11, more in particular in paragraph 11.4.1, the disclosure thereof being incorporated herein by reference. Geodesic radome with good properties may be obtained when the plies contain a unidirectional fabric and even better results may be obtained when the plies contain a woven fabric. Most preferred woven fabrics are plain and basket weaves.

In a preferred embodiment, a ply forming the plurality of plies is rotated with an angle with respect to adjacent plies. Preferably said angle is between 30° and 90°, more preferably between 35° and 70°, most preferably between 40° and 50°. For examples in case of plies comprising a unidirectional fabric, the running direction of the polyolefin tapes in one ply is preferably under an angle with respect to the running direction of the polyolefin tapes in an adjacent ply. For unidirectional plies said angle is preferably about 90°. In case of a woven fabric, typically having a weft direction and a warp direction, the weft direction in a ply is preferably rotated with an angle with respect to the weft direction in an adjacent ply. For woven plies said angle is preferably about 90°, more preferably about 45°.

The plies used in accordance with the invention may also comprise a binder or a matrix material, which may be impregnated between the polyolefin tapes or deposited onto said tapes. Usually, the binder or the matrix is used to hold the tapes together and/or to improve the mechanical properties of the panel comprising the plies. Various binders or matrices may be used, examples thereof including thermosetting and thermoplastic materials. From the group of thermosetting materials, vinyl esters, unsaturated polyesters, epoxides or phenol resins are preferred. From the group of thermoplastic materials, polyurethanes, polyvinyls, polyacrylics, polybutyleneterephthalate (PBT), polyolefins or thermoplastic elastomeric block copolymers such as polyisopropene-polyethylene-butylene-polystyrene or polystyrene-polyisoprene-polystyrene block copolymers are preferred. In particular, isocianates when used as a matrix or a binder, proved to impart the inventive materials with good performances at high and ultra-high frequencies.

Mostly preferred, however, is that the plies are substantially free of any binder or matrix material impregnated between the polyolefin tapes and/or deposited on said tapes. It was observed that in the absence of binders or matrix materials, an improved geodesic radome may be improved.

According to the invention, the shaped panels used for constructing the geodesic radome have a specific combination of mechanical characteristics. Preferably, the compressive strength of said panels is between 15 MPa and 75 MPa, more preferably between 20 MPa and 50 MPa, most preferably between 30 MPa and 45 MPa. Preferably, the interlaminar shear strength of said panels is between 5 MPa and 50 MPa, more preferably between 7 MPa and 30 MPa, most preferably between 9 MPa and 20 MPa. Preferably the thermal expansion of said panels is between 5e−6 1/K and 30e−6 1/K, more preferably between 9e−6 1/K and 25e−6 1/K, most preferably between 13e−6 1/K and 20e−6 1/K.

Preferably, said shaped panels also have a tensile stress at break of at least 100 MPa, more preferably of at least 250 MPa, most preferably of at least 500 MPa. Preferably, said shaped panels also have an elongation at break of at most 5%, more preferably of at most 3%, most preferably of at most 1%. Said shaped panels also have a modulus of elasticity of preferably at least 20 GPa, more preferably of at least 40 GPa, most preferably of at least 50 GPa.

Preferably, said shaped panels are substantially free of any binder or matrix material.

The thickness of the shaped panels used in accordance with the invention may vary within large ranges. Preferably said thickness is preferably at least 3 mm, more preferably at least 10 mm, most preferably at least 50 mm. For practical reasons, said thickness is preferably at most 200 mm, more preferably at most 175 mm, most preferably at most 150 mm. The areal density of the shaped panels used in accordance with the invention is preferably at least 20 g/m2, more preferably at least 30 g/m2, most preferably at least 40 g/m2. Said areal density is preferably at most 55 g/m2, more preferably at most 50 g/m2, most preferably at most 45 g/m2.

Shaped panels having the above mentioned mechanical characteristics can be made according to a process comprising the steps of:
  a) providing a plurality of plies comprising polyolefin tapes;
  b) providing at least one pre-formed polymeric film;
  c) stacking the plurality of plies to obtain a ply-stack having an upper surface and a lower surface, which is opposite to the upper surface, and placing the at least one pre-formed polymeric film at least on the upper surface to create an assembly containing said ply-stack and said pre-formed polymeric film;
  d) compressing the assembly of step c) at a pressure of at least 30 bars and at a temperature of less than the melting temperature of the polyolefin tapes, for a dwell time;
  e) cooling the assembly to below 70° C., preferably to room temperature, followed by releasing the pressure;
  f) removing the pre-formed polymeric film from the assembly; and
  g) shaping the assembly of step f) to obtain a shaped panel.

The invention further relates to such a process.

The number of plies at step a) may be chosen to obtain shaped panel having the desired thickness or areal density. The skilled person can routinely determine the number of plies to yield the desired thickness or areal density of the shapes panel.

According to step b) of the process of the invention, at least one pre-formed polymeric film is provided. By pre-formed polymeric film is herein understood a film manufactured from a polymeric material, wherein said film is freestanding, e.g. a sample of said film of e.g. 50 cm×50 cm does not break under its own weight when suspended at a height of double its highest dimension.

Pre-formed polymeric films manufactured from various polymeric materials can be used according to the process of the invention. In one embodiment, said pre-formed polymeric film is manufactured from a polyolefin that is different, i.e. it belongs to a different polyolefin class, than the polyolefin used to manufacture the polyolefin tapes contained by the plies. Other preferred polymeric materials for manufacturing the pre-formed polymeric films used in accordance to the process of the invention include polyvinyl-based materials, e.g. polyvinyl chloride, and silicone-based materials. Good results may be obtained when the pre-formed polymeric films are films manufactured from polyvinyl chloride or silicon rubber.

The thickness of the pre-formed polymeric film is preferably at least 50 μm, more preferably at least 100 μm, most preferably at least 150 μm. Preferably, the thickness of the pre-formed polymeric film is between 100 μm and 25 mm, more preferably between 200 μm and 20 mm, most preferably between 300 μm and 15 mm. For example, for silicon rubber films most preferred thicknesses are between 500 μm and 15 mm, while for polyvinyl chloride films most preferred thickness are between 1 mm and 10 mm. Silicon rubber and polyvinyl chloride films having a wide range of thicknesses are commercially available and may be obtained e.g from Arlon (US) and WIN Plastic Extrusion (US), respectively.

Pre-formed polymeric films manufactured from the above mentioned materials are commercially available. Moreover, the skilled person can easily produce such films with techniques commonly known in the art, e.g. extrusion, extrusion-moulding, solid-state compression or film-blowing, and stretch these films unidirectionally or bidirectionally to such an extent to obtain the required mechanical properties.

According to step c) of the process of the invention, the plies are stacked to obtain a ply-stack having an upper-stack surface and a lower-stack surface, which is opposite to the upper-stack surface. At least one pre-formed polymeric film is then placed at least on the upper-stack surface to create an assembly containing said ply-stack and said pre-formed polymeric film. It goes without saying that although called upper-stack surface and lower-stack surface, these denominations are not limiting and they are interchangeable. Better results may be obtained when a pre-formed polymeric film is placed on both the upper-stack surface and on the lower-stack surface.

The assembly of step c) of the process of the invention is preferably compressed at step d) with a pressure of at least 50 bars, more preferably of at least 100 bars, most preferably of at least 150 bars. Any conventional pressing means may be utilized in the process of the invention e.g. a WN Anlagepress. It was observed that good results may be obtained if a double belt press is used and in particular an isobaric double belt press. Isobaric double belt presses are known in the art, e.g. TEIJIN CITATION, and are manufactured for example by Hymmen (DE).

The temperature during compression is generally controlled through the mould temperature and can be measured with e.g. thermocouples placed between the plies. The temperature during the compression step is preferably chosen below the melting temperature ($T_m$) of the polyolefin tapes as measured by DSC. For example, in the case of polyethylene tapes and more in particular in case of UHMWPE tapes, a temperature for compression of preferably between 135° C. and 150° C., more preferably between 145° C. and 150° C. may be chosen. The minimum temperature generally is chosen such that a reasonable speed of consolidation is obtained. In this respect 50° C. is a suitable lower temperature limit, preferably this lower limit is at least 75° C., more preferably at least 95° C., most preferably at least 115° C.

After compressing the assembly, the assembly is cooled under pressure to preferably the room temperature, after which the pressure is released. The pre-formed polymeric film is then removed from the assembly and a compressed ply-stack having suitable mechanical properties is obtained.

The shaping at step g) of the process of the invention can be carried out according to known methods in the art. For example the panels can be cut into shape to obtain three-, four-, five-, six-sided panels or other multiple-sided panels. The panels can also be imparted a curvature in one or more directions. A preferred process for creating three dimensionally shaped panels having a curvature in more than one direction is known for example from CASE 24242.

The so obtained shaped panels are then utilized to construct the radome of the invention. The panels can be connected to each other and eventually to a frame by means known in the art, e.g. by using a joint connector as described in U.S. Pat. No. 6,173,547 included herein by reference. It was observed however that due to the specific combination of mechanical properties of the shaped panels used in accordance with the invention, a frame-less geodesic radome can be constructed. Usually a frame, e.g. a metal frame, supports the panels in a geodesic radome, such as it is described for example in U.S. Pat. No. 6,098,347. However, such a metal frame negatively influences the properties of the geodesic radome. It was observed that for the geodesic radome of the invention, the frame could be dispensed with. Therefore the geodesic radome of the invention is preferably a frame-less radome.

The invention further relates to a radar system comprising an antenna, e.g. a phased array antenna and the geodesic radome of the invention.

The invention further relates to shaped panels containing a consolidated plurality of plies, the plies comprising polyolefin tapes, said panels having the above mentioned mechanical properties and in particular having a compressive strength of between 10 MPa and 100 MPa, an interlaminar shear strength of between 3 MPa and 75 MPa and a thermal expansion of between 1e−6 1/K and 50e−6 1/K. It was observed that the shaped panels of the invention are very suitable for constructing curved structures, e.g. domes, bowed roofs, spherical or circular buildings and the like. The invention therefore also relates to a curved structure comprising the shaped panels of the invention.

The invention also relates to a reticulated structure containing a consolidated plurality of plies, the plies comprising polyolefin tapes, wherein the shaped panels have a compressive strength of between 10 MPa and 100 MPa, an interlaminar shear strength of between 3 MPa and 75 MPa and a thermal expansion of between 1e−6 1/K and 50e−6 1/K.

It was observed that the frame supported and frameless geodesic radomes as well as the curved and reticulated structures of the invention have a good response at least to wind induced loads. In particular they may resist to hurricane tape winds, e.g. winds having a speed of around 200 km/h. In particular considering a wind induced buckling, temperature effects and interlaminar stresses it was observed that the radomes and the structures of the invention perform exceedingly well.

METHODS FOR MEASUREMENT

Tensile stress at break of shaped panels was measured in accordance with ASTM D 638-10.

Elongation at break of shaped panels was measured in accordance with ASTM D 638-10.

Modulus of elasticity of shaped panels was measured in accordance with ASTM D 638-10.

Compressive strength of shaped panels was measured in accordance with ASTM D 695-10.

Interlaminar shear strength of shaped panels was measured in accordance with ASTM D 2344/D2344M-00 2006.

Thermal expansion of shaped panels was measured in accordance with ASTM D 696/DIN 53752.

The tensile properties of polyolefin tapes: tensile strength, elongation at break and tensile modulus are defined and determined at 25° C. on tapes of a width of 2 mm as specified in ASTM D882, using a nominal gauge length of the tape of 440 mm, a crosshead speed of 50 mm/min.

The melting temperature (also referred to as melting point) of a polyolefin is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

The invention claimed is:

1. A geodesic radome comprising shaped panels containing a consolidated plurality of plies, the plies comprising polyolefin tapes, wherein the shaped panels have a compressive strength of between 10 MPa and 100 MPa, an interlaminar shear strength of between 3 MPa and 75 MPa and a thermal expansion of between 1 e-6 1/K and 50e-6 1/K.

2. The radome according to claim 1 wherein the shaped panels have a shape chosen from the group consisting of triangles, rectangles, squares, hexagons, octagons, other multi-sided shapes having rectilinear or curved sides, an orange peel-like shape, and combinations thereof.

3. The radome according to claim 1 wherein said radome is a structure that can be mapped entirely from triangular panels.

4. The radome according to claim 1 wherein said radome comprises gore-shaped panels.

5. The radome according to claim 1 wherein said radome comprises five-sided panels and six-sided panels.

6. The radome according to claim 1 wherein said radome has a ground diameter of at least 3 m.

7. The radome according to claim 1 wherein said radome has a height of at least 3 m.

8. The radome according to claim 1 wherein said radome has a ground diameter/height ratio of between 0.1 and 100.

9. The radome according to claim 1 wherein the tapes have a width of between 1 mm and 2000 mm.

10. The radome according to claim 1 wherein the polyolefin tapes are polyethylene tapes, more preferably high or ultrahigh molecular weight polyethylene ([U]HMWPE) tapes.

11. The radome according to claim 1 wherein the polyolefin tapes are polyethylene tapes and wherein the polyethylene tapes are made by a solid-state process.

12. The radome according to claim 1 wherein the polyolefin tapes and more in particular of the polyethylene tapes have a tensile strength of preferably at least 0.5 GPa.

13. The radome according to claim 1 wherein the polyolefin tapes and more in particular of the polyethylene tapes have a tensile modulus of preferably at least 30 GPa.

14. The radome according to claim 1 wherein the plies contain a fabric chosen from the group consisting of woven fabrics, knitted fabrics, plaited fabrics, braided fabrics, nonwoven fabrics and combinations thereof.

15. The radome according to claim 1 wherein the shaped panels are substantially free of any binder or matrix material.

* * * * *